(12) United States Patent
Zhang et al.

(10) Patent No.: US 12,092,553 B1
(45) Date of Patent: Sep. 17, 2024

(54) INTEGRATED BROADBAND ENERGY COLLECTING AND SENSING DEVICE FOR ROD-CABLE STRUCTURE

(71) Applicant: ZHEJIANG UNIVERSITY, Hangzhou (CN)

(72) Inventors: Chunli Zhang, Hangzhou (CN); Qichen Wen, Hangzhou (CN); Weiqiu Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/630,978

(22) Filed: Apr. 9, 2024

(30) Foreign Application Priority Data

Apr. 10, 2023 (CN) .......................... 202310371573.4

(51) Int. Cl.
*G01M 5/00* (2006.01)
*H02N 2/18* (2006.01)

(52) U.S. Cl.
CPC ........ *G01M 5/0066* (2013.01); *G01M 5/0025* (2013.01); *G01M 5/0041* (2013.01); *H02N 2/188* (2013.01)

(58) Field of Classification Search
CPC .... G01M 5/00; G01M 5/0066; G01M 5/0083; G01M 5/0025; G01M 5/0041; G01M 5/005; G01M 7/00; G01M 7/025; G01M 7/045; G01M 7/06; H02N 2/00; H02N 2/18; H02N 2/186; H02N 2/188; H02N 2/183; B60C 23/0411
See application file for complete search history.

(56) References Cited

FOREIGN PATENT DOCUMENTS

| CN | 104410327 A | | 3/2015 | |
|---|---|---|---|---|
| CN | 106230314 A | | 12/2016 | |
| CN | 106230317 A | | 12/2016 | |
| CN | 106301074 A | | 1/2017 | |
| CN | 106602929 A | * | 4/2017 | ............. H02N 2/186 |
| CN | 111060194 A | * | 4/2020 | |
| CN | 115378299 A | * | 11/2022 | |

* cited by examiner

*Primary Examiner* — Son T Le
*Assistant Examiner* — Matthew W. Baca (57) ABSTRACT

The invention discloses an integrated broadband energy collecting and sensing device for a rod-cable structure, belonging to a piezoelectric vibration energy collecting and sensing field, which solves a problem that an existing piezoelectric energy harvester does not fully collect environmental multi-directional vibration energy. The device comprises an inner layer sleeve, an outer layer sleeve, a first piezoelectric thin film sensor, a self-powered module and a control communication module. The self-powered module comprises one or more vibrator groups. Each vibrator group comprises a plurality of piezoelectric vibrators arranged in sequence along a circumferential direction of the inner layer sleeve. The vibrator group collects vibration energy in any direction in a cross section of the sleeve. An inner surface of the outer layer sleeve is provided with a plurality of amplitude limiting blocks for protecting the piezoelectric vibrator during a severe vibration.

8 Claims, 9 Drawing Sheets

INTEGRATED BROADBAND ENERGY COLLECTING AND SENSING DEVICE FOR ROD-CABLE STRUCTURE

TECHNICAL FIELD

The present invention belongs to the field of a building monitoring technology, and particularly relates to an integrated broadband energy collecting and sensing device for a rod-cable structure.

BACKGROUND OF THE PRESENT INVENTION

Cables, rods and other structures are often used as stress components of a large-scale building structure; in order to ensure the long-term reliability of the large-scale building structure, the monitoring of these stress components has attracted great attention. In order to monitor a whole life cycle of the building structure condition, a wireless sensor network is needed to cooperate. However, how to supply energy for a wireless sensor node has become a major bottleneck restricting the development of the wireless sensor network. Because many sensor nodes exit in the wireless sensor network, if a traditional chemical battery is used for power supply, it needs to be replaced and charged regularly, which greatly increases a labor cost. Meanwhile, the traditional chemical battery will also cause great pollution to an environment. Therefore, it is a promising technology to collect the energy in the environment to supply a power to the sensor nodes.

The cables, the rods and other structures often vibrate in the air for various reasons. Therefore, aiming at vibration characteristics of the cables and the rods, it is of great engineering significance to study an energy collecting technology, design a vibration energy collector and apply the vibration energy collector to the wireless sensor network. The cables and the rods have the characteristics of a wide frequency band and randomness in vibration. At present, a traditional multi-directional energy collecting structure only collects the energy in certain directions or directions in a plane, and cannot collect the energy in any direction in space, so a utilization rate of environmental energy is not high, which has a limitation in the energy supply of the wireless sensor network nodes.

SUMMARY OF THE PRESENT INVENTION

The present invention aims at providing a multi-directional integrated broadband piezoelectric energy collecting and sensing device for a rod-cable vibration, which realizes the sensing of an external vibration and the collection of a multi-directional vibration energy.

According to the present invention, an integrated broadband energy collecting and sensing device for a rod-cable structure comprises an inner layer sleeve, an outer layer sleeve, a first piezoelectric thin film sensor, a self-powered module and a control communication module. The inner layer sleeve and the outer layer sleeve are coaxially fixed. The self-powered module is arranged between an outer side surface of the inner layer sleeve and an inner side surface of the outer layer sleeve. The first piezoelectric thin film sensor is arranged on an inner side surface of the inner layer sleeve. The self-powered module supplies a power for the control communication module.

The self-powered module comprises one or more vibrator groups. Each vibrator group comprises a plurality of piezoelectric vibrators arranged in sequence along a circumferential direction of the inner layer sleeve. The piezoelectric vibrator comprises an elastic substrate, a piezoelectric ceramic sheet and a mass block. The piezoelectric ceramic sheet is fixed on a side surface of the elastic substrate. An inner end of the elastic substrate is fixed with the outer side surface of the inner layer sleeve. The mass block is fixed at an outer end of the elastic substrate. An included angle θ is formed between the side surface of the elastic substrate and an axis of the inner layer sleeve. A value of θ is 30° to 60°.

Preferably, a plurality of amplitude limiting blocks with the same number as the piezoelectric vibrators are fixed on the inner side surface of the outer layer sleeve. The amplitude limiting blocks are fixed on the inner side surface of the outer layer sleeve. In a circumferential direction of the inner side surface of the outer layer sleeve, the mass block on any piezoelectric vibrator is located between two adjacent amplitude limiting blocks.

Preferably, a second piezoelectric thin film sensor is fixed on one or two side surfaces of part or all of the amplitude limiting blocks.

Preferably, the outer side surface of the inner layer sleeve is provided with a plurality of mounting grooves; a number of the mounting grooves is the same as a number of the piezoelectric vibrators, the mounting grooves and the piezoelectric vibrators correspond to each other one by one; an inner end of the elastic substrate is inserted and fixed into the corresponding mounting groove on the inner layer sleeve.

Preferably, an included angle θ is formed between a length direction of the amplitude limiting block and an axis of the outer layer sleeve.

Preferably, the mounting groove is a rectangular groove, and a length direction is obliquely arranged relative to an axial direction of the inner layer sleeve.

Preferably, the self-powered module comprises a plurality of vibrator groups; qualities of the mass blocks in different vibrator groups are different; resonance frequencies of the piezoelectric vibrators in different vibrator groups are all within a vibration frequency range of a rod structure or a cable structure of a monitored building.

Preferably, both ends of the outer side surface of the inner layer sleeve and both ends of the inner side surface of the outer layer sleeve are provided with a plurality of second mounting holes uniformly distributed along the circumferential direction; each second mounting hole on the inner layer sleeve corresponds to each second mounting hole on the outer layer sleeve one by one and is fixedly connected through a connecting rod.

Preferably, the inner side surface of the inner layer sleeve is sleeved and fixed on an outer side of the rod or cable structure of the building in the working process.

Preferably, both the inner layer sleeve and the outer layer sleeve are both made of two semicircular plates which are detachably spliced.

Preferably, the control communication module comprises a controller and a wireless communication module; the controller receives the signals output by the first piezoelectric thin film sensor and the second piezoelectric thin film sensor, and the signals are output through the wireless communication module.

A working method for the integrated broadband energy collecting and sensing device for the rod-cable structure is as follows:

step 1: sleeving and fixing the inner layer sleeve on the rod structure or the cable structure of the monitored building; and step 2: when the rod structure or the cable structure vibrating, driving the inner layer sleeve, the outer layer sleeve and the self-powered module to vibrate together; when existing a wind power in an environment, acting a component of an air flow direction parallel to an axial direction of the inner layer sleeve on the piezoelectric vibrator, so that the piezoelectric vibrator arranged obliquely relative to the axial direction of the inner layer sleeve generating the wind-induced vibration; and outputting a current by the vibrated piezoelectric vibrator;

in a vibration process of the rod structure or the cable structure, the first piezoelectric thin film sensor inside the inner layer sleeve outputs an electrical signal corresponding to the vibration; when the mass block at the outer end of the piezoelectric vibrator collides with the amplitude limiting block, the second piezoelectric thin film sensor on the amplitude limiting block generates a pulse signal; and electrical signals measured by the first piezoelectric thin film sensor and the second piezoelectric thin film sensor are wirelessly output through the control communication module for use by an upper computer.

The present invention has the beneficial effects as follows.

1. According to the present invention, the piezoelectric vibrators distributed along the axial and circumferential arrays are utilized, so that vibration energy of the structural vibration and the wind-induced piezoelectric vibrator vibration can be collected in a broadband and efficient manner and converted into electric energy to be stored in an energy storage element, which realizes a function of energy collection in all directions in space. Meanwhile, according to the present invention, the cantilever-type piezoelectric vibrator is obliquely arranged relative to an axis of the outer layer sleeve, so that an environmental wind power acts on the piezoelectric vibrator, which improves a power generation efficiency of the piezoelectric vibrator.

2. According to the present invention, the first piezoelectric thin film sensor is arranged on the inner side surface of the inner layer sleeve, which is used for collecting a vibration signal of the rod or the cable, and wirelessly transmitting the detected vibration signal to the upper computer by using the electric energy generated by the vibration, so as to realize the continuous monitoring of the building.

3. According to the present invention, the amplitude limiting block is arranged in the outer layer sleeve, and when the vibration is severe, the amplitude limiting block can restrain a swing amplitude of the piezoelectric vibrator and play a role in protecting the piezoelectric vibrator; moreover, when the piezoelectric vibrator collides with the amplitude limiting block, the second piezoelectric thin film sensor will be triggered to generate a pulse signal; and by combining the pulse signal with the vibration signal detected by the first piezoelectric thin film sensor, the present invention can comprehensively analyze the structural vibration and the wind-induced vibration of the building.

In the drawings: 1 refers to inner layer sleeve; 11 refers to mounting groove; 12 refers to first mounting hole; 2 refers to piezoelectric vibrator; 21 refers to elastic substrate; 22 refers to piezoelectric ceramics; 23 refers to mass block; 3 refers to connecting rod; 4 refers to outer layer sleeve; 5 refers to first piezoelectric thin film sensor; 41 refers to second mounting hole; 42 refers to amplitude limiting block; and 421 refers to second piezoelectric thin film sensor; 6 refers to control communication module; 61 refers to controller; and 62 refers to wireless communication module.

DETAILED DESCRIPTION OF PREFERRED EMBODIMENTS

The detailed contents and the detailed description of the preferred embodiments of the present invention will be further explained hereinafter in conjunction with the accompanying drawings, so that the advantages and features of the present invention can be more easily understood by those skilled in the art, thereby more clearly defining the protection scope of the present invention. The accompanying drawings are only used for illustrative purposes, showing only schematic diagrams, not physical drawings, and cannot be understood as limiting the present invention; in order to better illustrate the embodiment of the present invention, some parts in the accompanying drawings are omitted, enlarged or reduced, which do not represent a size of an actual product; and it is understandable to those skilled in the art that some well-known structures in the accompanying drawings and the descriptions thereof may be omitted.

Figure 1:
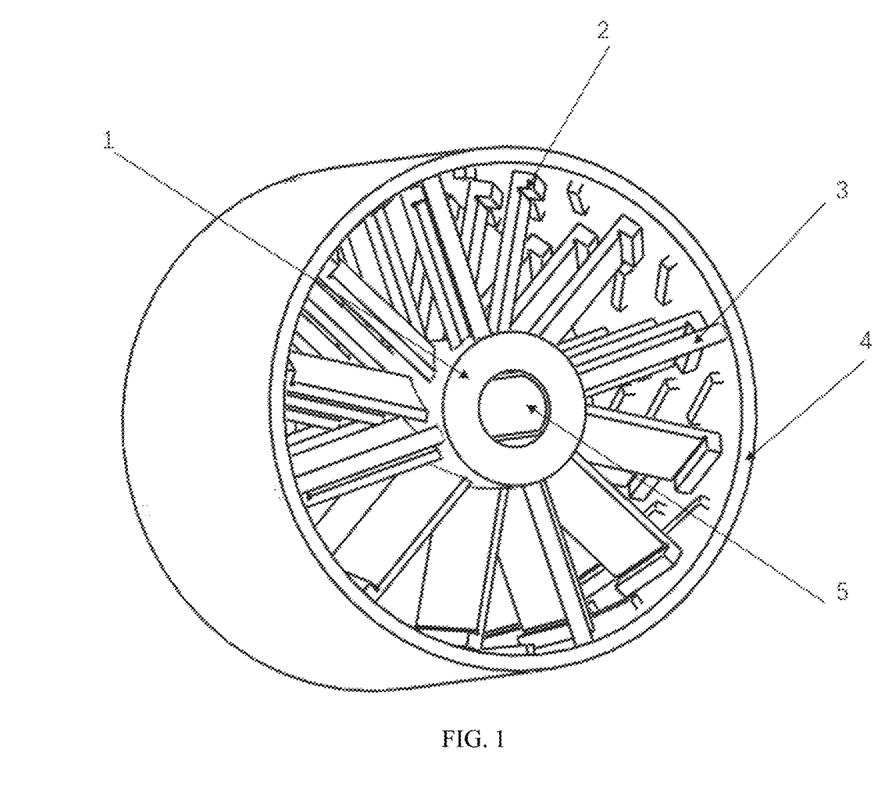
FIG. 1 is an overall schematic diagram of the present invention.
Figure 2:
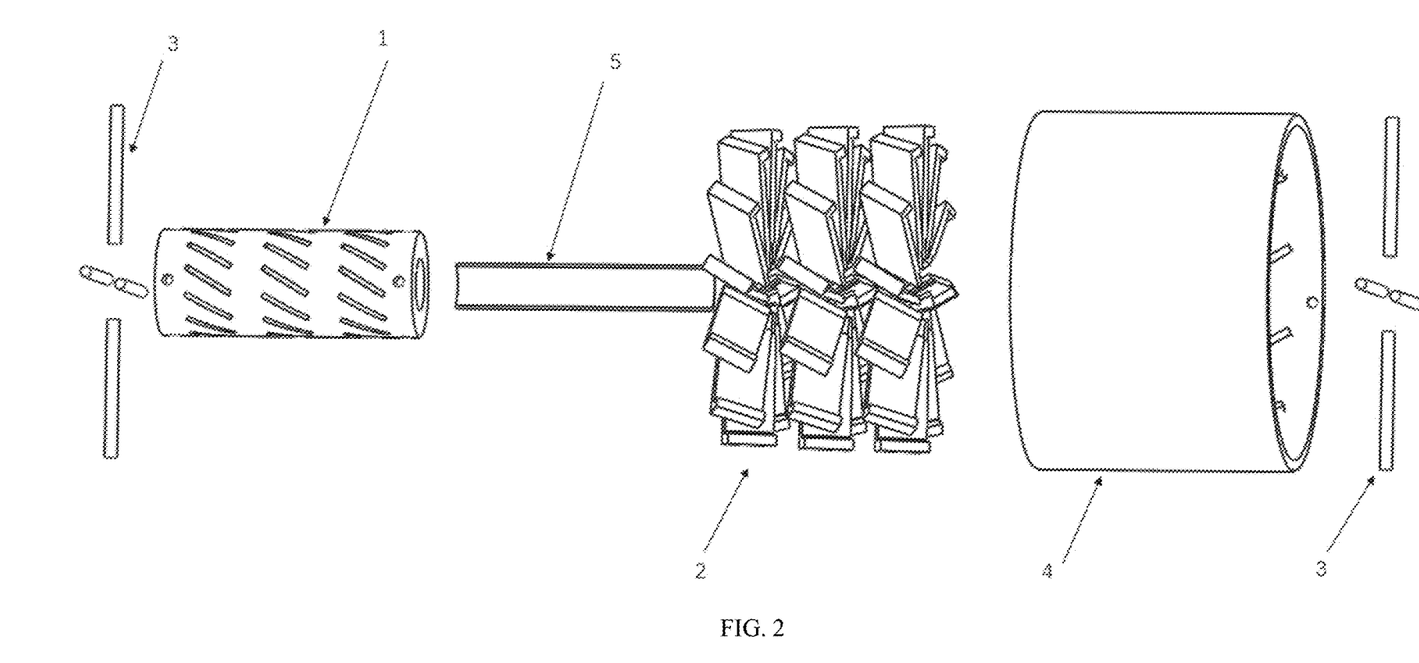
FIG. 2 is an explosion schematic diagram of the present invention.
Figure 3:
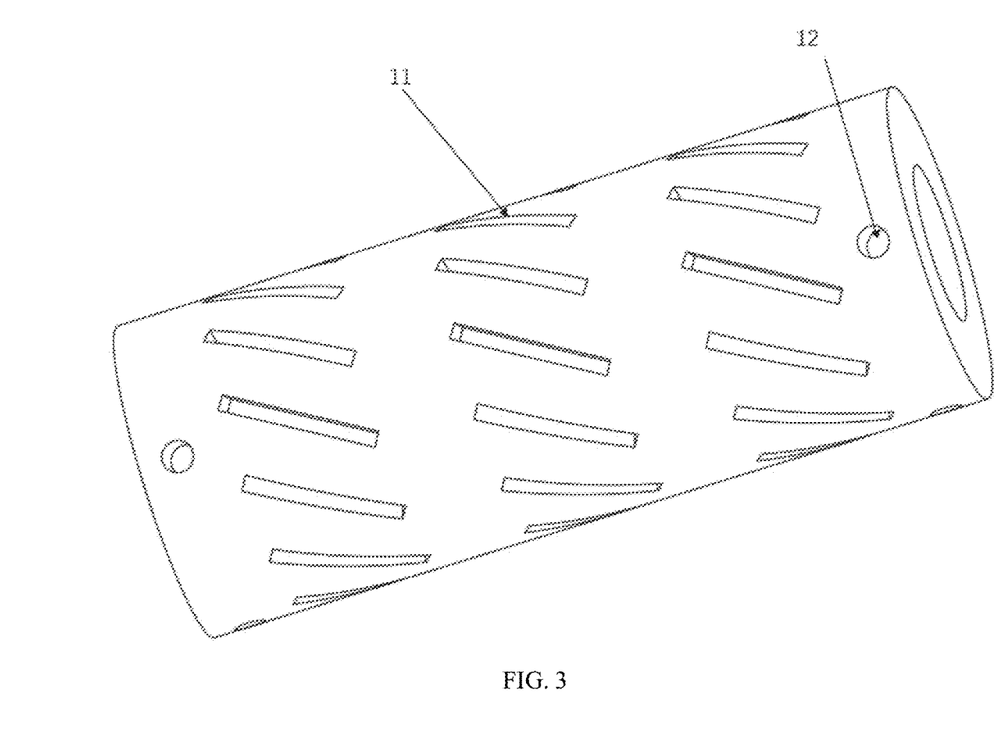
FIG. 3 is a schematic diagram of an inner layer sleeve in the present invention.
Figure 4:
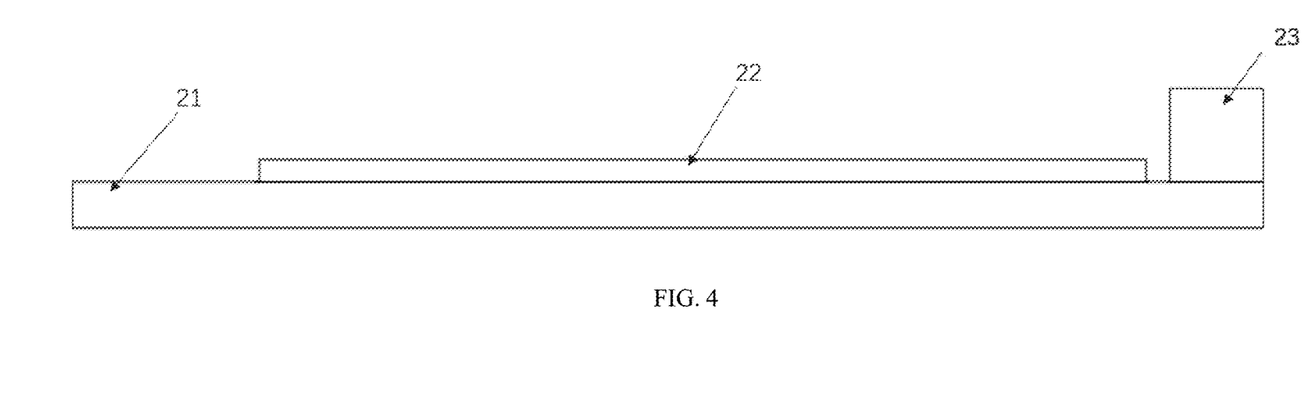
FIG. 4 is a schematic diagram of a piezoelectric vibrator in the present invention.
Figure 5:
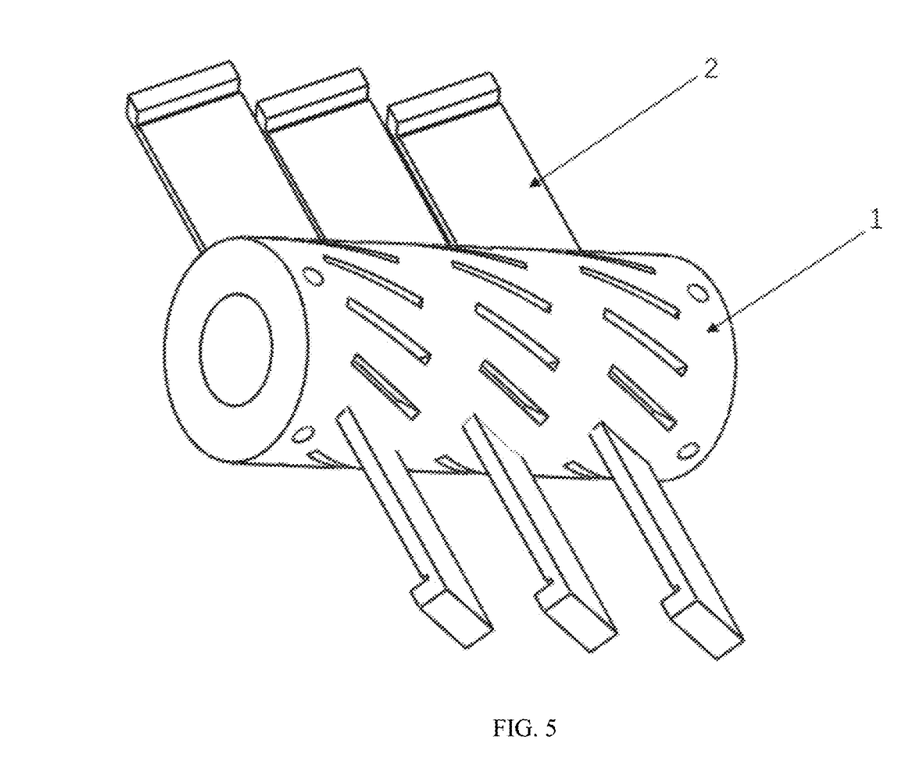
FIG. 5 is a schematic diagram of the axial arrangement of the piezoelectric vibrators in the present invention.
Figure 6:
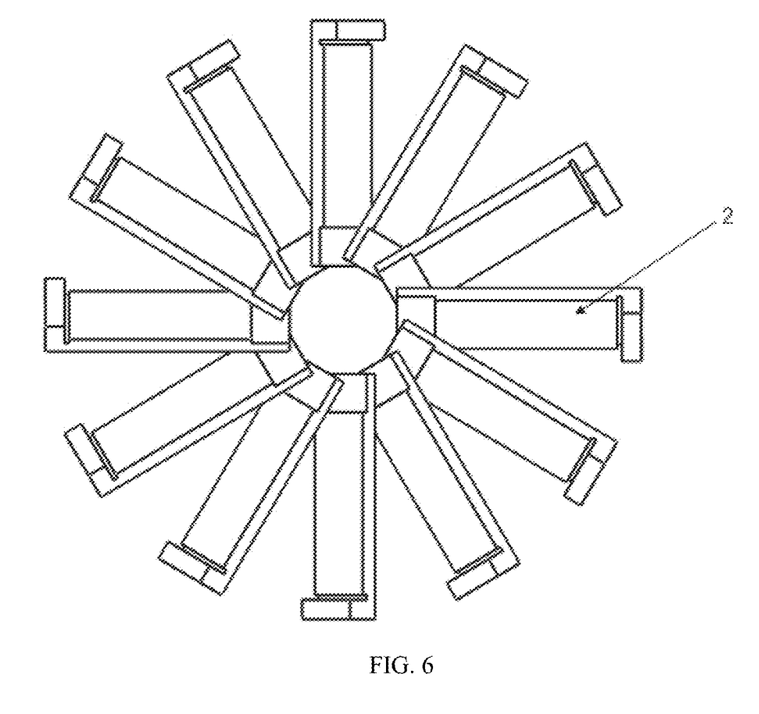
FIG. 6 is a schematic diagram of the circumferential arrangement of the piezoelectric vibrators in the present invention.
Figure 10:
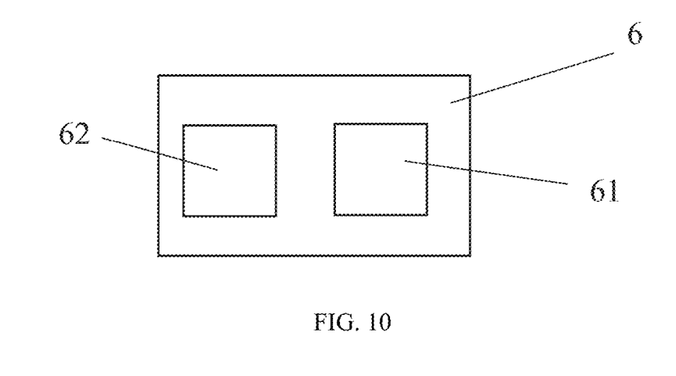
FIG. 10 is a block diagram of a control communication module in the present invention.

As shown in FIG. 1, FIG. 2 and FIG. 10, an integrated broadband energy collecting and sensing device for a rod-cable structure comprises an inner layer sleeve 1, a connecting rod 3, an outer layer sleeve 4, a first piezoelectric thin film sensor 5, a self-powered module and a control communication module 6. The inner layer sleeve 1 and the outer layer sleeve 4 are coaxially fixed via a plurality of connecting rods. The first piezoelectric thin film sensor 5 is attached to and fixed on an inner side surface of the inner layer sleeve 1.

The self-powered module is used to supply a power to the control communication module 6. The control communication module 6 communicates with an external base station or an upper computer, and transmits building vibration data collected by the integrated broadband energy collecting and sensing device to the upper computer, so as to realize the whole life cycle monitoring of the building. The self-powered module comprises a plurality of piezoelectric vibrators 2 distributed in a cylindrical array along an axial direction and a circumferential direction of a central axis of the inner layer sleeve 1. To be specific, the self-powered module comprises three vibrator groups arranged at equal intervals in sequence along the axial direction of the inner layer sleeve 1. Each vibrator group comprises twelve piezoelectric vibrators 2 uniformly distributed along the circumferential direction of the inner layer sleeve 1.

As shown in FIG. 3, FIG. 4, FIG. 5 and FIG. 6, an outer side surface of the inner layer sleeve 1 is provided with thirty-six mounting grooves for mounting the piezoelectric vibrators 2. The mounting grooves are all rectangular grooves, and a length direction thereof is arranged obliquely relative to an axis of the inner layer sleeve 1. The piezoelectric vibrator 2 comprises an elastic substrate 21, a piezoelectric ceramic sheet 22 and a mass block 23. The elastic substrate 21 and the piezoelectric ceramic sheet 22 are laminated and bonded together. An inn end of the elastic substrate 21 is inserted into the corresponding mounting groove on the inner layer sleeve 1. Under the restraint of the mounting groove, a length direction of the elastic substrate 21 is arranged along a radial direction of the inner layer sleeve 1. A side surface of the elastic substrate 21 is arranged obliquely relative to the axis of the inner layer sleeve 1, forming an included angle of 45°. The mass block 23 is fixed to an outer end of the elastic substrate 21. The piezoelectric vibrator 2 presents a cantilever beam structure, which can swing back and forth under an action of vibration, so that the piezoelectric ceramic sheet 22 is deformed to generate a current.

Figure 7:
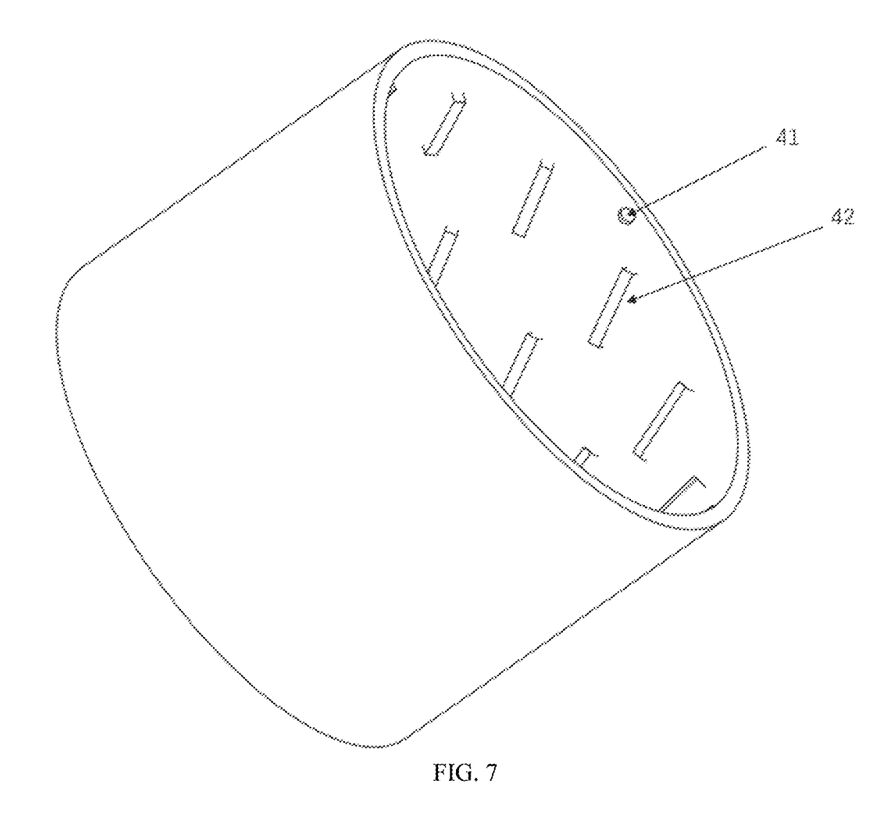
FIG. 7 is a schematic diagram of an outer layer sleeve in the present invention.
Figure 8:
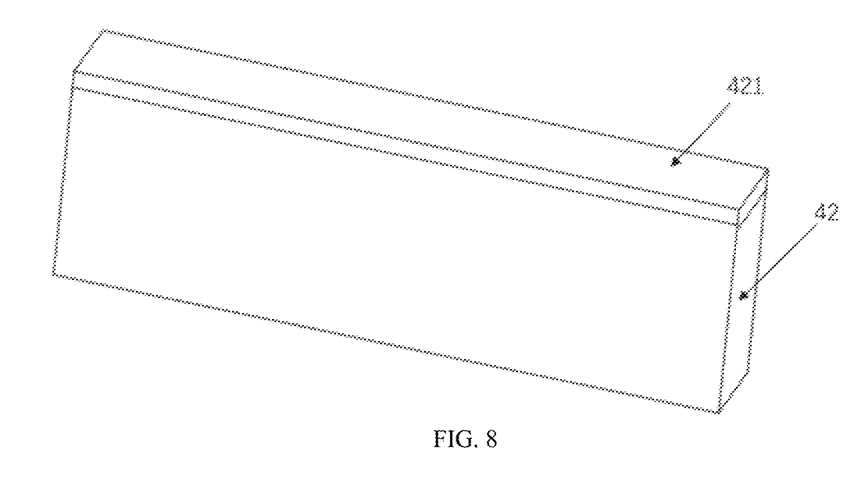
FIG. 8 is a schematic diagram of an amplitude limiting block in the present invention.

As shown in FIG. 7 and FIG. 8, thirty-six amplitude limiting blocks 42 are fixed on an inner side surface of the outer layer sleeve 4. The thirty-six amplitude limiting blocks 42 are divided into three amplitude limiting block groups in groups of twelve. The three amplitude limiting block groups correspond to the three vibrator groups one by one. The twelve amplitude limiting blocks 42 in the same amplitude limiting block group are uniformly distributed along a circumferential direction of an axis of the outer layer sleeve 4. The amplitude limiting blocks 42 are in a shape of cuboid, and length directions of the amplitude limiting blocks are all arranged obliquely relative to the axis of the inner layer sleeve 1, forming an included angle of 45°. In the circumferential direction of the inner side surface of the outer layer sleeve 4, the mass block 23 on any piezoelectric vibrator 2 is located between two adjacent amplitude limiting blocks 42 in the same amplitude limiting block group. When the mass block 23 swings back and forth, a limit position is restrained by two adjacent amplitude limiting blocks 42. A second piezoelectric thin film sensor 43 is fixed to one side surface of the amplitude limiting block 42 by an adhesive.

When the mass block 23 of the piezoelectric vibrator 2 touches the corresponding amplitude limiting block 42, the second piezoelectric thin film sensor 43 on the amplitude limiting block 42 will generate an electrical signal, so as to detect whether the piezoelectric vibrator 2 has an excessive vibration amplitude.

Figure 9:
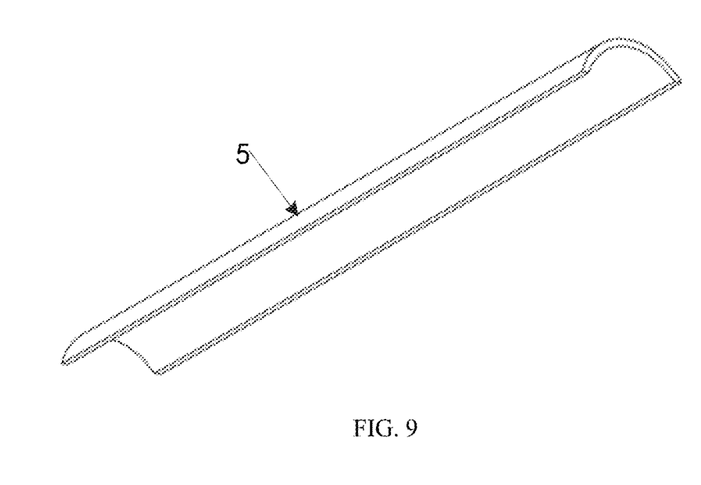
FIG. 9 is a schematic diagram of a first piezoelectric thin film sensor in the present invention.

In the embodiment, as shown in FIG. 9, the first piezoelectric thin film sensor 5 is formed by curling a planar PVDF piezoelectric thin film.

In the embodiment, a specific connection mode between the inner layer sleeve 1 and the outer layer sleeve 4 is as follows: both ends of the outer side surface of the inner layer sleeve 1 and both ends of the inner side surface of the outer layer sleeve 4 are provided with a plurality of second mounting holes 41 uniformly distributed in the circumferential direction. The second mounting holes 41 on the inner layer sleeve 1 and the second mounting holes 41 on the outer layer sleeve 4 correspond to each other one by one, and are fixedly connected by the connecting rod 3.

In the embodiment, an inner cavity of the inner layer sleeve 1 is sleeved and stuck or fixed on the rod or cable of the building. In order to facilitate the mounting of the inner layer sleeve 1 and the outer layer sleeve 4, both the inner layer sleeve 1 and the outer layer sleeve 4 are obtained by splicing and fixing two semicircular plates (a specific splicing and fixing structure belongs to the prior art, so as not to be shown in the drawing).

In FIG. 10, the control communication module 6 comprises a controller 61 and a wireless communication module 62. The controller 61 receives signals output by the first piezoelectric thin film sensor 5 and the second piezoelectric thin film sensor 43 and outputs the signals through the wireless communication module 62. An output interface of each piezoelectric ceramic sheet 22 is connected to a power supply interface of the controller 61 and the wireless communication module 62 through a voltage stabilizing module, so as to realize the automatic long-term monitoring of the building.

A working principle of the present invention is as follows:

The adhesive is used to bond the inner side surface of the inner layer sleeve to the rod structure or the cable structure of the building. When the rod structure or the cable structure vibrates, the inner layer sleeve 1, the outer layer sleeve 4 and the self-powered module are driven to vibrate together. Each piezoelectric vibrator oscillates back and forth, so that the piezoelectric ceramic sheet 22 is strained to generate electric energy, and a current is output through electrodes at both inner and outer sides of the piezoelectric ceramics.

Meanwhile, when existing a wind power in an environment, a component of an air flow direction parallel to an axial direction of the inner layer sleeve 1 is acted on the piezoelectric vibrator, so that the piezoelectric vibrator arranged obliquely relative to the axial direction of the inner layer sleeve generates the wind-induced vibration, thus further improving the electric energy output by the piezoelectric ceramic sheet 22 on the piezoelectric vibrator.

During the vibration of the rod structure or the cable structure of the building, the first piezoelectric thin film sensor 5 located inside the inner layer sleeve 1 generates a periodic signal. When the vibration of the rod structure or the cable structure is severe, an amplitude of the piezoelectric vibrator increases, and the mass block 23 at the outer end of the piezoelectric vibrator collides with the amplitude limiting block 42; a second piezoelectric thin film sensor 421 bonded to the amplitude limiting block 42 generates a pulse signal. A vibration condition of the rod structure or the cable structure of the building can be analyzed by collecting the signals of the second piezoelectric thin film sensor 421 and the first piezoelectric thin film sensor 5.

A vibration signal received by the first piezoelectric thin film sensor 5 mainly comes from a structural vibration; the pulse signal generated by the second piezoelectric thin film sensor 421 comes from the combination of a wind-induced vibration and a structural vibration; therefore, respective influences of the wind-induced vibration and the structural vibration can be judged respectively by comprehensively analyzing the signals output by the second piezoelectric thin film sensor 421 and the first piezoelectric thin film sensor 5.

In order to improve the power generation efficiency of the piezoelectric vibrator, the piezoelectric vibrator is required to work near a resonance frequency, that is, the vibration frequency of the rod structure or the cable structure is close to the resonance frequency of the piezoelectric vibrator, so that the piezoelectric vibrator resonates, a strain in the piezoelectric ceramic sheet is the largest, and thus enabling the electric energy output to be the largest.

In an actual situation, the vibration frequencies of the rod structure and the cable structure are complex and changeable, so it is difficult for the piezoelectric vibrator with a specific resonance frequency to resonate with the rod and cable. In order to realize the good matching between the working frequency of the device and the vibration frequency of the rod and cable;

the mass blocks 23 of the piezoelectric vibrators in different vibrator groups are set to different weights, so that the piezoelectric vibrators in different vibrator groups have different resonance frequencies. The resonant frequencies of the piezoelectric vibrators in different vibrator groups are uniformly distributed at different positions within a vibration frequency range of the rod structure or the cable structure. Therefore, the vibration frequency matching between the self-powered module and the rod and cable with variable vibration frequencies is realized within a certain range, the power generation efficiency and performance of the whole device is improved, and the whole integrated broadband energy collecting and sensing device achieve a purpose of broadening the frequency band, and thus improving the stability of the electric energy output by the integrated broadband energy collecting and sensing device.

In addition, because different piezoelectric vibrators in the same vibrator group have different orientations, the self-powered module in the present invention can collect vibration energies in different vibration directions, so as to further improve the stability of the electric energy output.

To sum up, the omnidirectional integrated broadband energy collecting and sensing device for the rod-cable structure provided by the present invention can collect the vibration energy with a certain frequency band width in the environment in multiple directions, which effectively broadens the working frequency band, and improves the energy collection efficiency and the power generation performance. Moreover, the first piezoelectric thin film sensor is integrated into the device, so that the device has an ability to detect the wind-induced vibration and the structural vibration at the same time.

The above embodiments are only used to illustrate but not to limit the technical solution of the present invention. Any equivalent structure or equivalent process transformation made by using the contents of the specification and the accompanying drawings of the present invention, or being directly or indirectly used in other related technical fields, are similarly fallen within the patent protection scope of the present invention.

We claim:

1. An integrated broadband energy collecting and sensing device for a rod-cable structure, comprising: an inner layer sleeve, an outer layer sleeve, a first piezoelectric thin film sensor, a self-powered module and a control communication module; wherein the inner layer sleeve and the outer layer sleeve are coaxially fixed; the self-powered module is arranged between an outer side surface of the inner layer sleeve and an inner side surface of the outer layer sleeve; the first piezoelectric thin film sensor is arranged on an inner side surface of the inner layer sleeve; and the self-powered module supplies a power for the control communication module;

the self-powered module comprises a plurality of vibrator groups; each vibrator group comprises a plurality of piezoelectric vibrators arranged in sequence along a circumferential direction of the inner layer sleeve; each piezoelectric vibrator comprises an elastic substrate, a piezoelectric ceramic sheet and a mass block; the piezoelectric ceramic sheet is fixed on a side surface of the elastic substrate; an inner end of the elastic substrate is fixed with the outer side surface of the inner layer sleeve; the mass block is fixed at an outer end of the elastic substrate; an included angle $\theta$ is formed between the side surface of the elastic substrate and an axis of the inner layer sleeve; and a value of $\theta$ is 30° to 60°;

a plurality of amplitude limiting blocks with the same number as the piezoelectric vibrators are fixed on the inner side surface of the outer layer sleeve; the amplitude limiting blocks are fixed on the inner side surface of the outer layer sleeve; in a circumferential direction of the inner side surface of the outer layer sleeve, the mass block on any piezoelectric vibrator is located between two adjacent amplitude limiting blocks; a second piezoelectric thin film sensor is fixed on one or two side surfaces of part or all of the amplitude limiting blocks; and the amplitude limiting block restrains a swing amplitude of the piezoelectric vibrator;

qualities of mass blocks in different vibrator groups are different; resonance frequencies of the piezoelectric vibrators in different vibrator groups are all within a vibration frequency range of a rod structure or a cable structure of a monitored building; and in a working process, signals of the second piezoelectric thin film sensor and the first piezoelectric thin film sensor are collected to analyze a vibration condition of the rod structure or the cable structure of the building, a vibration signal received by the first piezoelectric thin film sensor corresponds to a structural vibration; and a vibration signal received by the second piezoelectric thin film sensor corresponds to combination of a wind-induced vibration and a structural vibration.

2. The integrated broadband energy collecting and sensing device for the rod-cable structure according to claim 1, wherein an included angle $\theta$ is formed between a length direction of the amplitude limiting block and an axis of the outer layer sleeve.

3. The integrated broadband energy collecting and sensing device for the rod-cable structure according to claim 1, wherein the outer side surface of the inner layer sleeve is provided with a plurality of mounting grooves; a number of the mounting grooves is the same as a number of the piezoelectric vibrators, the mounting grooves and the piezoelectric vibrators correspond to each other one by one; and an inner end of the elastic substrate is inserted and fixed into the corresponding mounting groove on the inner layer sleeve.

4. The integrated broadband energy collecting and sensing device for the rod-cable structure according to claim 1, wherein both ends of the outer side surface of the inner layer sleeve and both ends of the inner side surface of the outer layer sleeve are provided with a plurality of second mounting holes uniformly distributed along the circumferential direction; each second mounting hole on the inner layer sleeve corresponds to each second mounting hole on the outer layer sleeve one by one and is fixedly connected through a connecting rod.

5. The integrated broadband energy collecting and sensing device for the rod-cable structure according to claim 1, wherein the inner side surface of the inner layer sleeve is sleeved and fixed on an outer side of the rod or cable structure of the building in the working process.

6. The integrated broadband energy collecting and sensing device for the rod-cable structure according to claim 1, wherein both the inner layer sleeve and the outer layer sleeve are both made of two semicircular plates which are detachably spliced.

7. The integrated broadband energy collecting and sensing device for the rod-cable structure according to claim 1, wherein the control communication module comprises a controller and a wireless communication module; the controller receives the signals output by the first piezoelectric thin film sensor and the second piezoelectric thin film sensor, and the signals are output through the wireless communication module.

8. A monitoring method for the rod structure or the cable structure of the building, using the integrated broadband energy collecting and sensing device of claim 1, wherein:
the monitoring method comprises the following steps of:
step 1: sleeving and fixing the inner layer sleeve on the rod structure or the cable structure of the monitored building; and
step 2: when the rod structure or the cable structure vibrating, driving the inner layer sleeve, the outer layer sleeve and the self-powered module to vibrate together; when existing a wind power in an environment, acting a component of an air flow direction parallel to an axial direction of the inner layer sleeve on the piezoelectric vibrator, so that the piezoelectric vibrator arranged obliquely relative to the axial direction of the inner layer sleeve generating the wind-induced vibration; and outputting a current by the vibrated piezoelectric vibrator;
wherein, in a vibration process of the rod structure or the cable structure, the first piezoelectric thin film sensor inside the inner layer sleeve outputs an electrical signal corresponding to the vibration; when the mass block at the outer end of the piezoelectric vibrator collides with the amplitude limiting block, the second piezoelectric thin film sensor on the amplitude limiting block generates a pulse signal; and the electrical signals measured by the first piezoelectric thin film sensor and the second piezoelectric thin film sensor are wirelessly output through the control communication module for use by an upper computer.

* * * * *